(12) United States Patent
Hironaka et al.

(10) Patent No.: US 6,677,589 B2
(45) Date of Patent: Jan. 13, 2004

(54) OBJECT DETECTING DEVICE WITH A PYROELECTRIC SENSOR

(75) Inventors: Atsushi Hironaka, Shijonawate (JP); Motoo Ikari, Kyoto (JP); Yuji Takada, Kyoto (JP); Hiroshi Matsuda, Hirakata (JP); Yorinobu Murayama, Moriguchi (JP)

(73) Assignee: Matsushita Electric Works, Ltd., Kadoma (JP)

( * ) Notice: Subject to any disclaimer, the term of this patent is extended or adjusted under 35 U.S.C. 154(b) by 0 days.

(21) Appl. No.: 10/090,825

(22) Filed: Mar. 6, 2002

(65) Prior Publication Data

US 2003/0047671 A1 Mar. 13, 2003

(30) Foreign Application Priority Data

Sep. 10, 2001 (JP) ........................................ 2001-273653

(51) Int. Cl.[7] .................................................. H01J 4/40
(52) U.S. Cl. ............................... 250/338.3; 250/338.1; 250/336.1
(58) Field of Search ........................ 250/336.1, 338.1, 250/338.3, 338.2, 339.14, 342, 221; 340/567

(56) References Cited

U.S. PATENT DOCUMENTS 4,703,171 A * 10/1987 Kahl et al. .................. 250/221
5,311,019 A * 5/1994 Gammarino ............. 250/338.3
5,753,983 A * 5/1998 Dickie et al. ............. 307/141.4
6,313,462 B1 * 11/2001 Matsuda et al. ......... 250/338.3
6,597,287 B1 * 7/2003 Steinel ....................... 340/541

FOREIGN PATENT DOCUMENTS

JP 2-9891 1/1990
JP 6-3366 1/1994

* cited by examiner

*Primary Examiner*—David Porta
*Assistant Examiner*—Christine Sung
(74) *Attorney, Agent, or Firm*—Oblon, Spivak, McClelland, Maier & Neustadt, P.C.

(57) ABSTRACT

An object detecting device utilizes a pyroelectric sensor providing a sensing current, a voltage amplifier providing an amplified voltage proportional to the sensing current, and a level monitor providing a detection signal when the amplified voltage exceeds a detection threshold. The device has a standby mode where the voltage amplifier receives a limited source current to provide the voltage of low amplification, and the level monitor provides a wake-up signal when the low amplified voltage exceeds a preliminary threshold lower than the detection threshold. In response to the wake-up signal, the device is switched to an operation mode where the amplifier receives a rated source current to provide a voltage of high amplification for comparison with the detection threshold. Thus, the amplifier is kept to be less-power consuming in the absence of the wake-up signal, reducing a power requirement.

12 Claims, 6 Drawing Sheets

OBJECT DETECTING DEVICE WITH A PYROELECTRIC SENSOR

BACKGROUND ART

1. Field of the Invention

The present invention is directed to an object detecting device with the use of a pyroelectric infrared radiation sensor, and more particularly a surveillance device for detecting the presence of a human in a room or space.

2. Description of the Prior Art

A typical object detecting device is disclosed in Japanese Utility Model Publication No. 2-9891 and Japanese Patent Publication No. 6-3366. The device utilizes a pyroelectric sensor generating a sensing current upon receiving an infrared radiation from a human body, and an I/V converter that converts the sensing current into a voltage. The device requires a voltage amplifier which amplifies the voltage from the I/V converter to an amplified voltage of a level sufficiently enough to be compared with a threshold for discriminating the presence of the human body. When the amplified voltage exceeds the threshold, a detector provides a detection signal which is then processed to issue a control output for activating an external device such as an alarming device and the like. The device is designed such that, once the device is energized, all the electronic components including voltage amplifier and the detector are made fully operational as being supplied with a rated current from a power source. Accordingly, the device will consume the power even in the absence of the infrared radiation of a level not causing the detection signal, i.e., in the absence of the human body. Thus, the prior device wastes the power and has to require frequent replacements of a battery when it is used as the power source for the device.

SUMMARY OF THE INVENTION

In view of the above problem, the present invention has been achieved to provide an improved object detecting device which is capable of reducing power consumption, yet retaining reliable object detection. The object detecting device in accordance with the present invention utilizes a pyroelectric sensor generating a sensing current in accordance with changes in the amount of infrared radiation incident on the sensor from an object. An I/V converter is provided to convert the sensing current into a corresponding voltage which is then amplified by a voltage amplifier to an amplified voltage. The device includes a detector with a level monitor which compares the amplified voltage with a predetermined detection threshold so as to provide a detection signal when the amplified voltage satisfies with a detection criterion with regard to the detection threshold. The detection signal is then processed to issue a control output for activating an external device. The voltage amplifier is capable of providing a restricted voltage output of a low amplitude when receiving a limited source current from the power source and providing a rated voltage output of a high amplitude when receiving from the power source a rated source current higher than the limited source current. The detector is added with a threshold selector which has, in addition to the above detection threshold, a preliminary threshold lower than the detection threshold, and is normally set to give the preliminary threshold to the level monitor. The level monitor compares the restricted voltage output from the voltage amplifier with the preliminary threshold and provides a wake-up signal when the restricted voltage output satisfies a preliminary criterion with regard to the preliminary threshold. In response to the wake-up signal, the threshold selector switches the preliminary threshold to the detection threshold. Also included in the device is a mode selector which, in response to the wake-up signal, provides an operation mode for supplying the rated source current from a power source to the voltage amplifier such that the level monitor compares the rated voltage output from the voltage amplifier with the detection threshold for detection of the object, and otherwise provides a standby mode for supplying the limited source current from the power source to the voltage amplifier. Thus, the device can be kept in the standby mode of consuming less power while the pyroelectric sensor generates a less current not critical to the detection of the object presence, and can be switched to the operation mode where the voltage amplifier gives the rated voltage output of a level sufficiently enough to make reliable detection once the pyroelectric sensor generates a critical output. Accordingly, it is a primary object of the present invention to provide an object detecting device which is capable of reducing power consumption, yet assuring reliable detection.

The mode selector is designed to keep the operation mode continuously for a predetermined time frame from the first advent of the detection signal and to switch it back to the standby mode thereafter for avoiding unnecessary power consumption after the object detection. In this connection, the mode selector is preferred to reset the time frame to start each time the detection signal is followed by another detection signal within the time frame, thereby extending the operation mode for successive and reliable detection of the object.

The mode selector may be provided with a reset input for receiving a reset signal from the external device. When the reset input is enabled, the mode selector operates to switch the operation mode forcibly into a rest mode of keeping the limited source current to be supplied to the voltage amplifier and at the same time disabling the level monitor upon seeing the first advent of the detection signal, and keeps the rest mode until receiving the reset signal at the reset input. Thus, the device can be interlocked or closely associated with the external device so as to keep the power consumption at a minimum level while the external device is reacting to make a dedicated function such as turning on an illumination appliance in response to the control output, thereby reducing the power consumption.

In order to start the device rapidly for reliable detection, the mode selector is preferred to supply an initialization current greater than the rated source current to the voltage amplifier only for a predetermined initialization time period immediately upon energization of the device. Further, the mode selector is preferred to select the rest mode for a predetermined stabilization time period immediately subsequent to the initialization time period, and to switch the rest mode into the standby mode thereafter. Thus, the voltage amplifier inherently requiring much initialization current can be rapidly made ready for reliable operation. After the stabilization time period, the components of the device can be made stable to be ready for reliable detection, while eliminating a possibility of causing erroneous circuit operation leading to a false detection due to unstable outputs of the voltage amplifier during the stabilization time period.

The voltage amplifier may be of two-stage amplifier having a front-stage amplifying section and a rear-stage amplifying section. In this connection, the mode selector is configured to supply the limited source current to the front-stage and rear-stage amplifying sections in the standby mode, and supply the limited source current to the front-stage amplifying section and the rated source current to the rear-stage amplifying section in the operation mode. With the use of the two-stage amplifier and the associated scheme of only changing the level of the current being fed to the rear-stage amplifying section, it is made possible to further reduce the power consumption as compared to a case where the entire current to the amplifier is changed from the limited level to the rated level.

Further, the voltage amplifier is preferred to generate the rated voltage output which saturates at a level just above the detection threshold for the purpose of minimizing the power consumption in the operation mode, yet retaining reliable detection.

Preferably, the threshold selector includes a first voltage divider providing the preliminary threshold from a reference voltage and a second voltage divider providing the detection threshold from the same reference voltage. The first voltage divider is composed of a series combination of first resistors, while the second voltage divider is composed of a series combination of second resistors. The first resistor is selected to have a higher resistance than the second resistor in order to realize an advantageous effect of reducing the power consumption made at the first voltage divider to give the preliminary threshold with the use of the first resistors of high resistance, while enabling the second voltage divider to give the detection threshold accurately with the use of the second resistors of low resistance. Because of that first and second resistors are preferably selected from those that can be integrated in a chip for circuit miniaturization of the device, and also because of that the resistors of the type available can give an accurate resistance value as the intended resistance lowers, the second voltage divider makes the use of the second resistors of low resistance to provide the accurate the detection threshold for reliable object detection therewith, while the first voltage divider can consumes less power with the use of the first resistors of high resistance in providing the preliminary threshold which is not critical for object determination and could be rough as compared to the detection threshold. For instance, the first resistor may be selected from a non impurity-doped polysilicon resistor and a MOS (metal oxide semiconductor) transistor, while the second resistor may be selected from an impurity-doped polysilicon resistor.

These and still other objects and advantageous features of the present invention will become more apparent from the following description of a preferred embodiment when taken in conjunction with the attached drawings.

DETAILED DESCRIPTION OF THE EMBODIMENT

Figure 1:
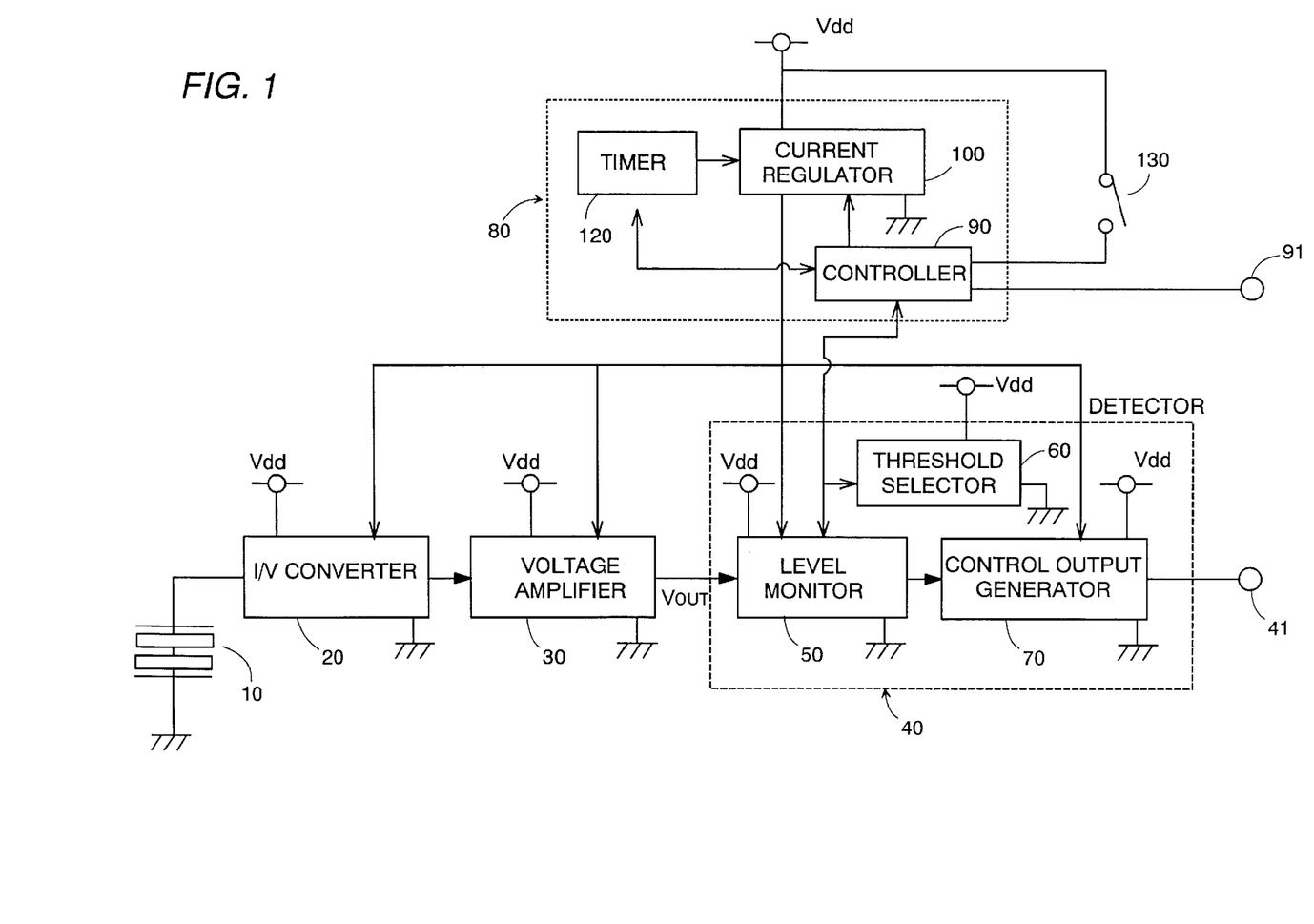
FIG. 1 is a block diagram showing a circuit of an object detecting device in accordance with a preferred embodiment of the present invention.
Figure 4:
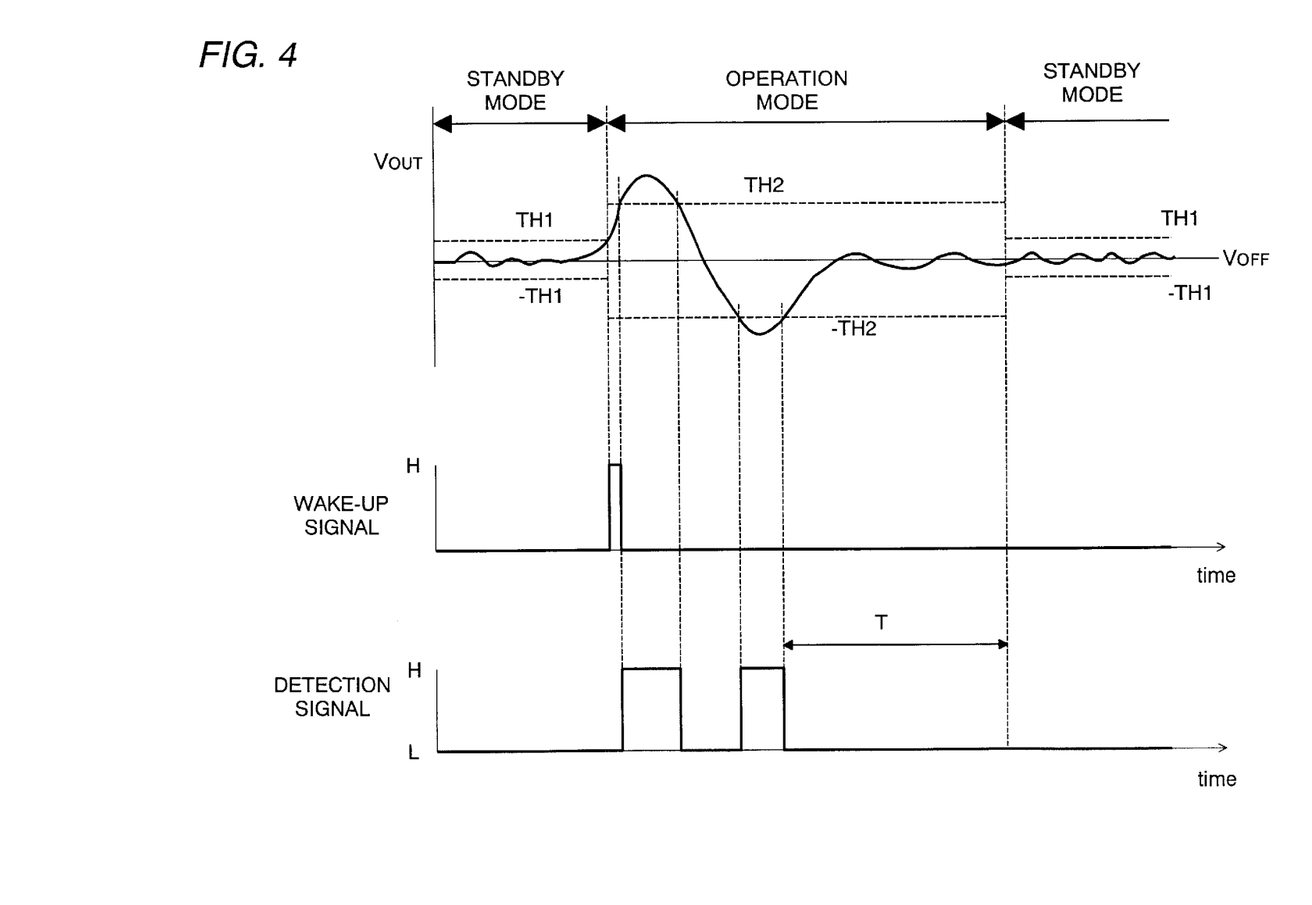
FIG. 4 is a waveform chart illustrating the operation of the above device.

Referring now to FIG. 1, there is shown an object detecting device in accordance with a preferred embodiment of the present invention. The device is utilized for surveillance of a room or the like space and is adapted to be interlocked with an external device such as an illumination appliance, an alarm and the like for activating the external device upon detection of a human body in the room. The device utilizes a pyroelectric sensor 10 which generates a sensing current in proportion to changes in the amount of incident infrared radiation from the human body. The sensing current is fed to an I/V converter 20 where it is converted into a corresponding voltage. The voltage is then amplified at a voltage amplifier 30 to provide a voltage output to a detector 40 for detection of the human body. The amplifier 30 has an offset voltage VOFT around which the voltage output VOUT varies, as shown in FIG. 4, in proportion to the amount of the sensing current from the pyroelectric sensor 10.

The detector 40 includes a level monitor 50, a threshold selector 60 providing two thresholds, namely, a preliminary threshold TH1 and a detection threshold TH2 (>TH1) to the level monitor 50, and a control output generator 70. The voltage output VOUT from the amplifier 30 is compared at the level monitor 50 selectively with TH1 (−TH1) and TH2 (−TH2) to generate a wake-up signal when the voltage output satisfies a relation that VOUT>TH1 or VOUT<−TH1, and to generate a detection signal when the voltage output satisfies a relation that VOUT>TH2 or VOUT<−TH2. The control output generator 70 is provided to issue, in response to the detection signal, a control output at an output terminal 41 for activating the external device. As will be discussed later, the wake-up signal is utilized to switch a standby mode, which is a default mode of consuming less power, to an operation mode for reliable detection of the object. The standby mode is defined to provide a limited source current to the I/V converter 20, the voltage amplifier 30, the level monitor 50, and the control output generator 70 for activating the same at a minimum performance level, while the operation mode is defined to provide a rated source current higher than the limited current to the same for activating the same at its full capability to obtain a reliable and consistent detection result.

Figure 2:
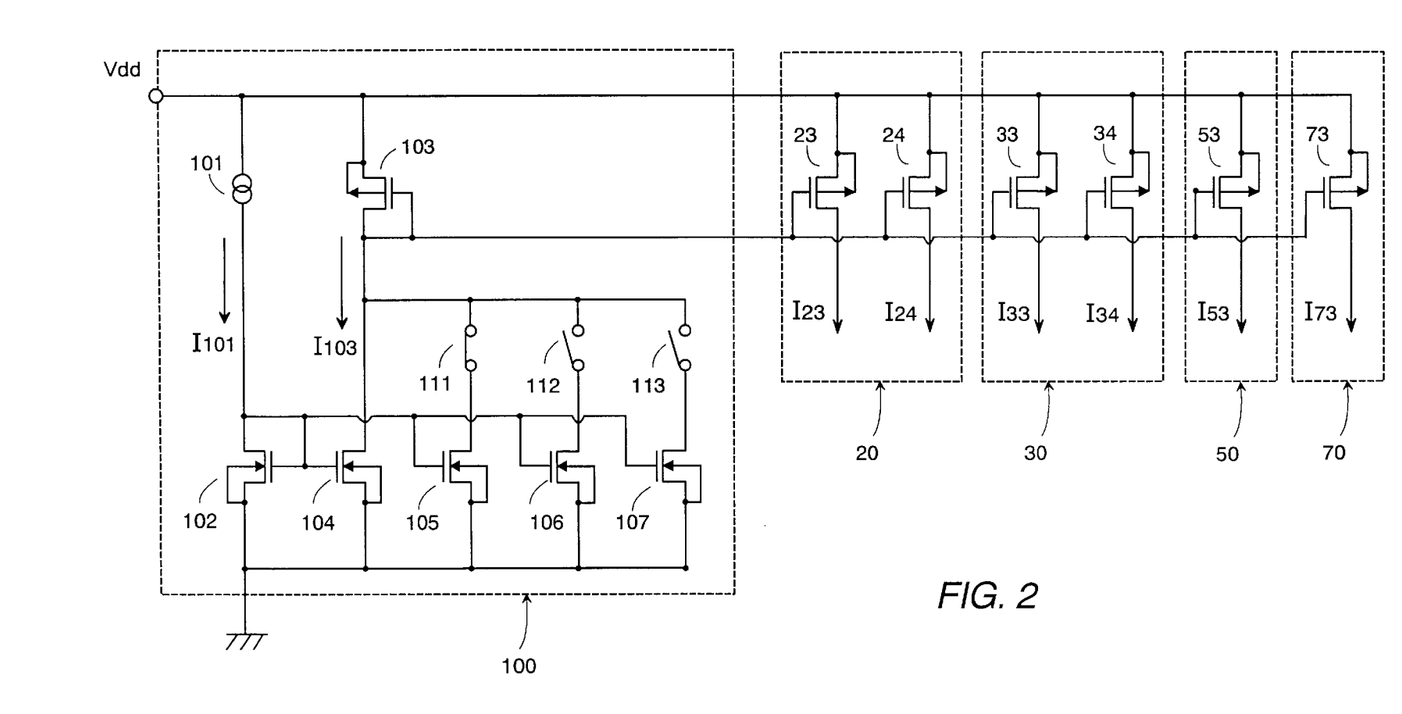
FIG. 2 is a circuit diagram showing a current regulator and its associated circuits of the above device.

For this purpose, the device is provided with a mode selector 80 which includes a controller 90, a current regulator 100, and a timer 120. The controller 90 is provided to switch the standby mode to the operation mode and vice versa. The current regulator 100 is configured to flow source currents of different levels designated by the controller 51. The source currents includes the limited source current of about 0.03 $\mu$A to 0.09 $\mu$A, for example, the rated source current of about 0.18 $\mu$A to 0.6 $\mu$A, for example, and an initialization current higher than the rated current. As shown in FIG. 2, the current regulator 100 includes a constant current supply 101, a plurality of FETs 102 to 107, and switches 111 to 113. The constant current supply 101 supplies a reference current $I_{101}$ from a power source Vdd through FET 102, while a series combination of FETs 103 and 104 is connected across the series combination of the current supply 101 and FET 102 to flow a mirror current $I_{103}$. Connected across FET 104 are three sets of series combinations each composed of each one of switches 111 to 113 and each one of FETs 105 to 107, as illustrated, such that the mirror current $I_{103}$ can vary by selective closing and opening of switches 111 to 113. As the mirror current $I_{103}$ varies, the I/V converter 20, the voltage amplifier 30, the level monitor 50, and control output generator 70 that are connected to receive a correspondingly varied voltage will be supplied with one of the limited source current, the rated source current, and the initialization source current. For instance, as illustrated in the figure, the voltage amplifier 30 includes two FETs 33 and 34 of which gates are connected to receive the voltage corresponding to the mirror current $I_{103}$ in order to flow currents $I_{33}$ and $I_{34}$ as one of the limited source current, the rated source current, and the initialization source current from the power source Vdd. Whereby, the voltage amplifier 30 can be selectively made to provide the restricted voltage output proportional to the voltage from the I/V converter 20, to provide the rated voltage output proportional to the voltage from the I/V converter 20, and to complete the initialization, as will be discussed later.

Figure 3:
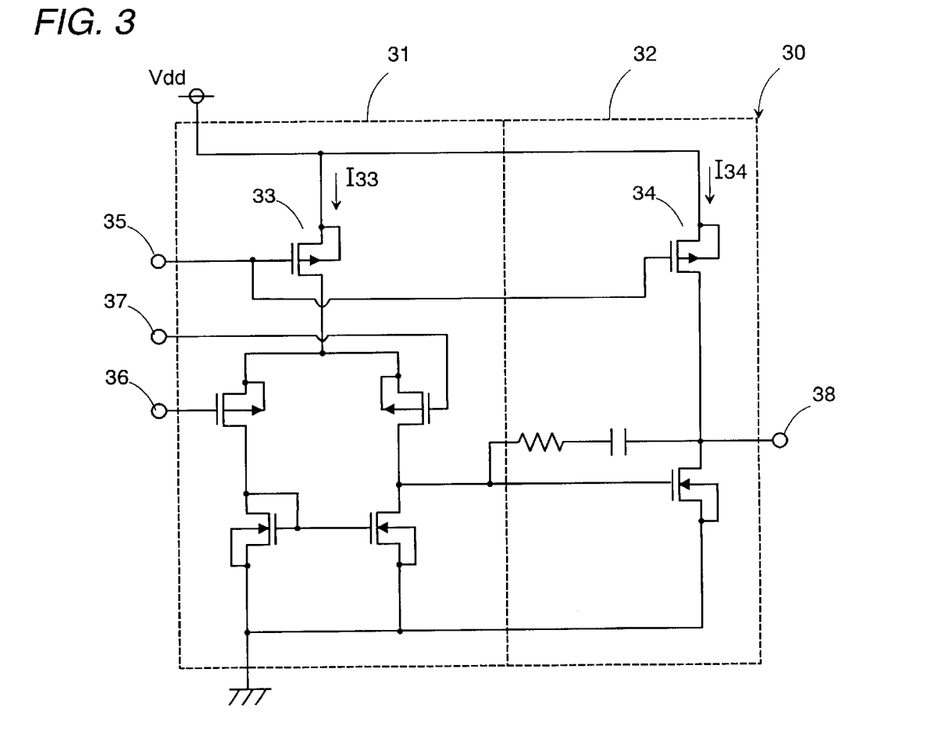
FIG. 3 is a circuit diagram of a voltage amplifier utilized in the above device.

As shown in FIG. 3, the voltage amplifier 30 is of a two-stage amplifier including a front-stage amplifying section 31 and a rear-stage amplifying section 32. These sections 31 and 32 include current regulating FETs 33 and 34 which respond to the mirror current $I_{103}$ flowing through the current regulator 100 for flowing the source currents $I_{33}$ and $I_{34}$ from the power source Vdd to the front-stage amplifying section 31 and the rear-stage amplifying section 32, respectively. The gates of FETs 31 and 32 are commonly connected to receive the voltage corresponding to the mirror current $I_{103}$ at a current control input 35. The front-stage amplifying section 31 includes a reference voltage input 36 for receiving a predetermined reference voltage and a voltage input 37 for receiving the voltage from the I/V converter 20 to amplify the same. The rear-stage amplifying section 32 includes an output terminal 38 for providing the amplified output to the level monitor 50.

Also, the I/V converter 20 is of two-stage configuration having two parallel current regulating FETs 23 and 24 which are connected between the power source Vdd and the ground and of which gates are connected to receive the voltage corresponding to the current $I_{103}$ in order to flow currents $I_{23}$ and $I_{24}$ as one of the limited source current, the rated source current, and the initialization source current, thereby providing the corresponding output to the voltage amplifier 30. Likewise, the level monitor 50 and the output controller 70 include current regulating FETs 53 and 73 respectively in order to flow individual currents $I_{53}$ and $I_{73}$ as one of the above different source currents. It is noted in this connection that these source currents $I_{33}$, $I_{34}$, $I_{23}$, $I_{24}$, $I_{53}$ and $I_{73}$ may be made different from each other by selecting the corresponding FETs of different characteristics.

The controller 90 is normally set to make the standby mode in which the current regulator 100 responds to flow the limited source currents, and the threshold selector 42 is normally set to give the preliminary threshold TH1 to the level monitor 50 so that the level monitor 50 takes the voltage output VOUT as the restricted voltage from the voltage amplifier 30, i.e., the voltage of low amplification and compares it with the preliminary threshold TH1. When it is found that VOUT>TH1 or VOUT<-TH1, as shown in FIG. 4, the level monitor 50 provides the wake-up signal to the threshold selector 60 as well as to the controller 90 of the mode selector 80. Upon this occurrence, the threshold level selector 60 gives the detection threshold VTH2 to the level monitor 50, and at the same time the controller 90 selects the operation mode to cause the amplifier 30 to provide the voltage output VOUT as the rated voltage output, i.e., the voltage of high amplification. Thus, the level monitor 50 is enabled to compare the voltage output VOUT with the detection threshold TH2 and issue the detection signal when VOUT>TH2 or VOUT<-TH2. The detection signal is indicative of the presence of the human body and is converted into the control signal for activating the external device.

When the detection signal is issued, the controller 90 responds to activate the timer 120 to start counting time and switches the operation mode back to the standby mode after the timer counting a predetermined time frame T, thereby making the device to be ready for checking the next wake-up signal. In addition, the controller 90 constantly checks whether or not subsequent detection signal is issued within the time frame T, and resets the timer 120 to start counting time each time the subsequent detection signal is acknowledged within the time frame T, thereby extending the time frame T so long as the detection signal appears successively for notifying such event to the external device.

The controller 90 is optionally provided with a reset terminal 91 for receiving a reset signal from the external device. When connecting the rest terminal 91 to the external device, the controller 90 is set to select a rest mode once the detection signal is acknowledged and keeps the rest mode until receiving a reset signal from the external device. The rest mode is defined to keep supplying the limited source current to the I/V converter 20, the amplifier 30, the level monitor 50, and the control output generator 70, and at the same time disabling the level monitor 50, i.e., neglecting the result of the level monitor 50. Thus, it is possible to minimize the power consumption while the external device is responding, yet avoiding the occurrence of the wake-up signal which would provoke the operation mode. This is particularly advantageous when the external device is only required to activate for a limited time interval in response to the first advent of the detection signal.

Figure 5:
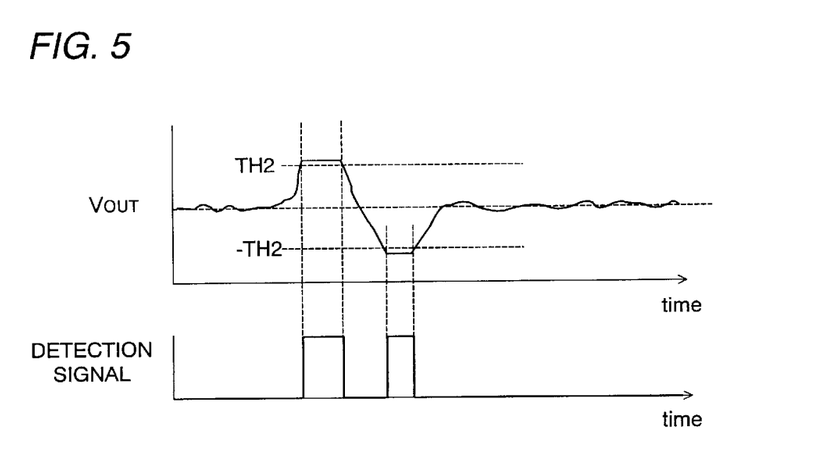
FIG. 5 is a waveform chart illustrating an operation of the mode selector.

In order to reduce the power consumption at the amplifier 30 once the detection signal is issued, the amplifier 30 may be selected to saturate the voltage output VOUT just above the detection threshold TH2 or just below -TH2 when supplied with the rated source current, as shown in FIG. 5.

Figure 6:
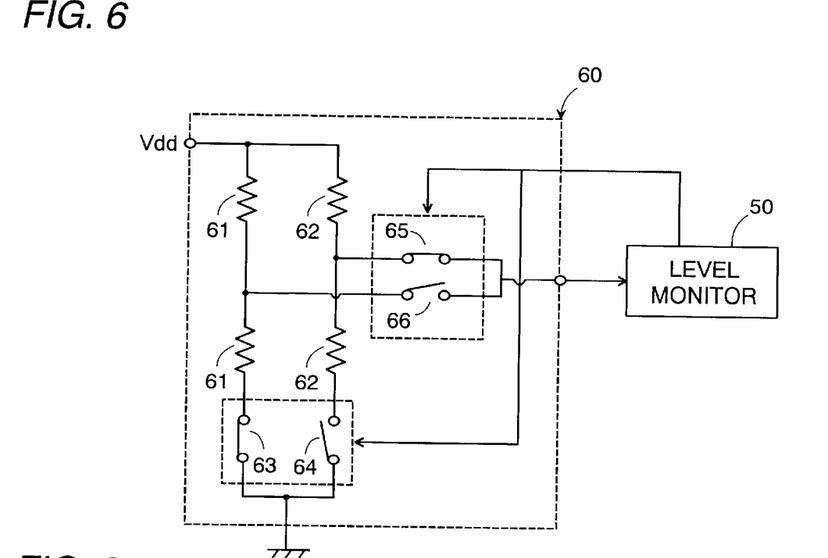
FIG. 6 is a circuit diagram of a threshold selector utilized in the above device.

As shown in FIG. 6, the threshold selector 60 includes a first voltage divider providing the preliminary threshold TH1 and a second voltage divider providing the detection threshold TH2 to the level monitor 50. The first voltage divider is a series combination of first resistors 61 connected in series with a switch 63 between the power source Vdd and the ground, while the second voltage divider is a series combination of second resistors 62 connected in series with a switch 64 between the power source and the ground. The connection between the first resistors 61 is connected through a switch 65 to the level monitor 50, while the connection between the second resistors 62 is connected through a switch 66 to the level monitor. Normally, the switches 63 and 65 are closed to provide the preliminary threshold TH1 to the level monitor 50. When receiving the wake-up signal from the level monitor 50, the switches 64 and 66 are closed to provide the detection threshold TH2 to the level monitor 50. In view of that the preliminary threshold may be rough as it does not critical to the detection of the human body, while the detection threshold have to be accurate for reliable detection, and also that available resistors elements capable of being integrated in a semiconductor chip together with other electronic components of the device exhibit more accurate resistance value as the resistance value lowers, it is contemplated in the present invention to use the first resistors 61 having the higher resistance and the second resistors 62 of lower resistance. Whereby, it is possible to give the reliable human detection with the accurately determined detection threshold, yet reducing the power consumption in providing the preliminary threshold with the use of the first resistors of high resistance. For instance, the first resistor 61 is selected from a non impurity-doped polysilicon resistor or MOS (metal oxide semiconductor) transistor, while the second resistor 62 is selected from impurity-doped polysilicon resistor.

Further, the device is designed to become stable rapidly upon being energized for immediate and reliable object detection. For this purpose, the controller 90 responds to the throw-in of a power switch 130 of the device for providing an initialization time period during which the initialization current higher than the rated current is allowed to flow in the I/V converter 20 and the voltage amplifier 30 for rapidly making these high current-consuming circuits operative, and the limited current is allowed to flow to the level monitor 50 and the control output generator 60 of less current-consuming circuits. Immediately thereafter, the controller 90 selects the rest mode of disabling the output of the level monitor 50 for a predetermined stabilization time during which the limited source current is supplied to make the whole circuits stable to be ready for reliable detection free from any erroneous operation due to unstable outputs from the individual circuits, particularly from the I/V converter 20 and the voltage amplifier 30. Thereafter, the controller 90 switches the rest mode to the standby mode, enabling the output of the level monitor 50 for making the intended operation of detecting the human body.

Figure 7:
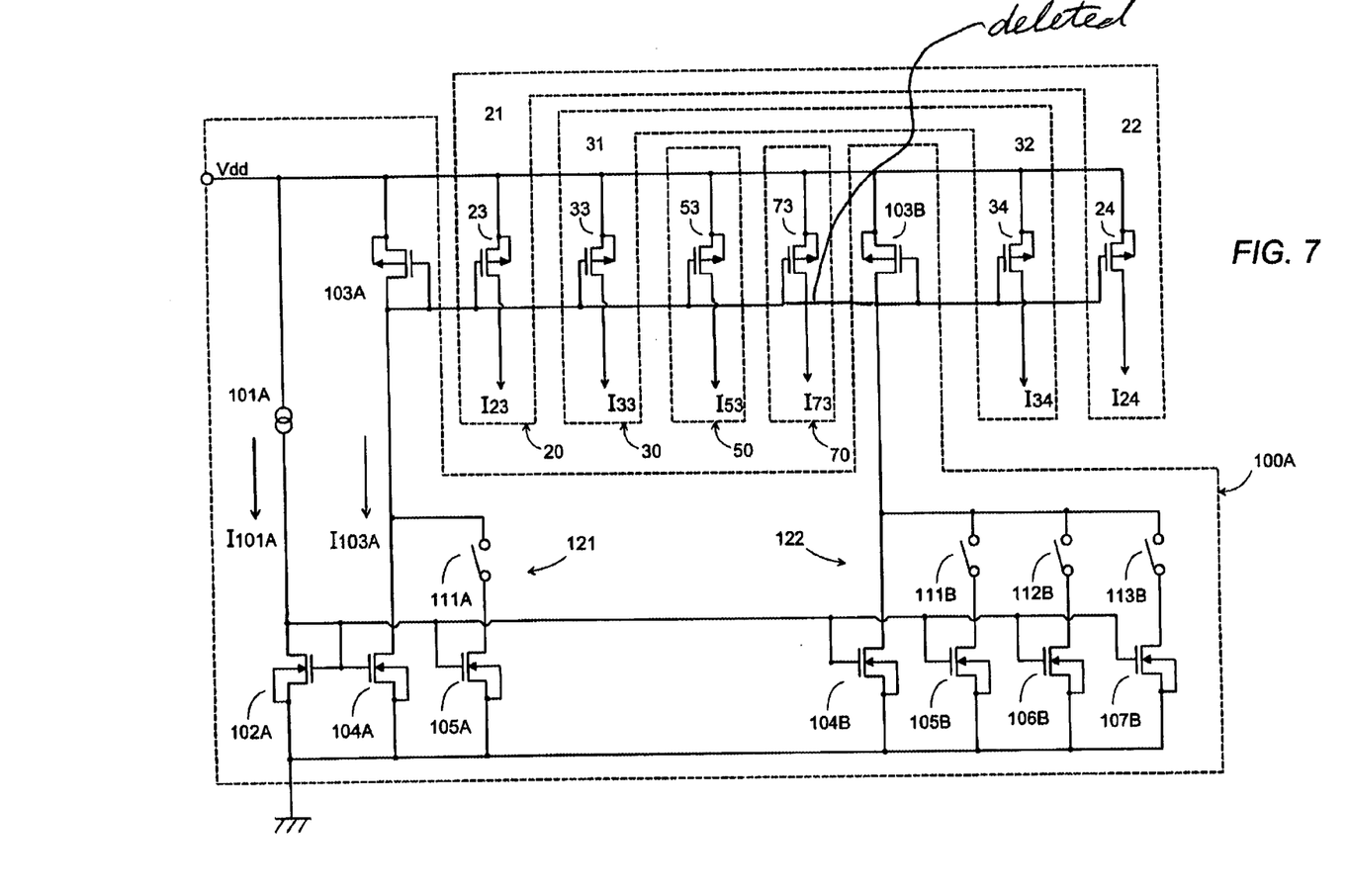
FIG. 7 is a circuit diagram showing a modified current regulator and its associated circuit applicable to the above device.
Figure 8:
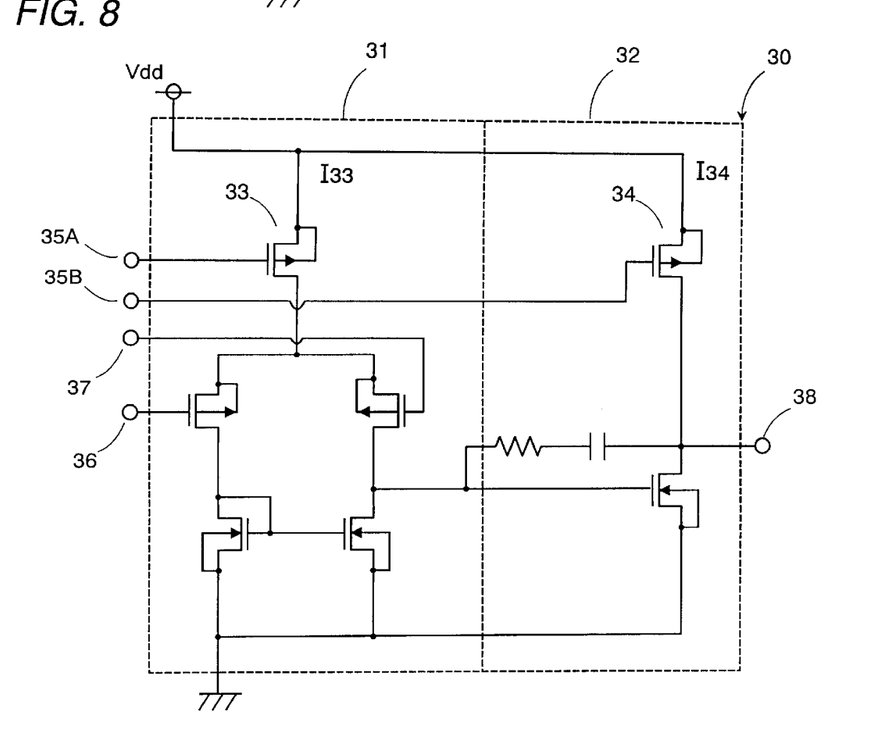
FIG. 8 is a circuit diagram of a voltage amplifier utilized in connection with the above modified current regulator.

FIGS. 7 and 8 show a modified current regulator 100A and associated circuits which are similar to those utilized in the above embodiment but are configured to switch the current being supplied to the rear-stage amplifier of the I/V converter 20 and the rear-stage amplifier of the voltage amplifier 30, while constantly flowing the limited source current to the front-stage amplifiers of the I/V converter 20, the front-stage amplifier of the voltage amplifier 30, the level monitor 50, and the control output generator 70. In this connection, the amplifier 30 is configured, as shown in FIG. 8, so that FET 33 of the front-stage amplifying section 31 and FET 34 of the rear-stage amplifying section 32 have individual gates to receive currents $I_{103}A$ and $I_{103}B$ of different levels or different voltage from the current regulator 100A, respectively through current control inputs 35A and 35B. As shown in FIG. 7, the current regulator 100A includes, in addition to a series combination of a constant current supply 101A and FET 102A connected across the power source Vdd, a front-end current generator 121 composed of FETs 103A, 104A and 105A and a switch 111A to provide a front-end mirror current $I_{103}A$, and a rear-end current generator 122 composed of FETs 103B, 104B and 105B, and switches 111B, 112B and 113B to provide a rear-end mirror current $I_{103}B$. The front-end mirror current $I_{103}A$ is applied as a corresponding voltage to the gate of current regulating FET 23 of the front-stage amplifying section 21 of the I/V converter 20, the gate of current regulating FET 33 of the front-stage amplifying section 31 of the amplifier 30, the gate of current regulating FET 53 of the level monitor 50, and the gate of the current regulating FET 73 of the control output generator 70 in order to flow the limited source currents $I_{23}$, $I_{33}$, $I_{53}$, and $I_{73}$ from the power source Vdd to the individual circuits 20, 30, 50, and 70. Likewise, the rear-end mirror current $I_{103}B$ is applied as a corresponding voltage to the gate of current regulating FET 24 of the rear-stage amplifying section 22 of the I/V converter 20, the gate of current regulating FET 34 of the rear-stage amplifying section 32 of the amplifier 30 in order to flow currents $I_{24}$ and $I_{34}$ from the power source Vdd to the rear-stage amplifying sections as one of the limited source current, rated source current, and the initialization current by selective activation of the switches 111B, 112B, and 113B.

In the absence of the wake-up signal from the level monitor 50, the controller 90 of the mode selector 80 sets the switches 111B, 112B, and 113B of the rear-end current generator 122 to make the rear-end mirror current $I_{103}B$ nearly equal to the front-end mirror current $I_{103}A$, thereby flowing the limited source current $I_{24}$ and $I_{34}$, which are nearly equal to those currents $I_{23}$, $I_{33}$, $I_{53}$, $I_{73}$ caused by the front-end mirror current $I_{103}A$, to the rear-stage amplifying sections of the I/V converter 20 and the amplifier 30. When the wake-up signal is acknowledge, the controller 90 is switched to provide the rear-end mirror current $I_{103}B$ larger than the front-end mirror current $I_{103}A$, thereby flowing the rated source current $I_{24}$ and $I_{34}$, which are greater than those currents $I_{23}$, $I_{33}$, $I_{53}$, $I_{73}$ caused by the front-end mirror current $I_{103}A$, to the rear-stage amplifying section of the I/V converter 20 and the amplifier 30. Thus, when the device is switched into the operation mode, the rated currents of high level can be supplied only to the rear-stage amplifying sections of the I/V converter 20 and the amplifier 30 for the intended performance, thereby avoiding unnecessary high current consumption otherwise made at the front-stage amplifying sections. The high initialization current required at the very beginning of energizing the device can be fed only to the rear-stage amplifying sections of the I/V converter 20 and the amplifier 30 while the limited source currents are fed to the front-stage amplifying sections of the I/V converter 20 and the amplifier 30, as well as to the level monitor 50 and the control output generator 70. In this sense, the current regulator 100A is also configured to provide the initialization current higher than the rated source current by selective activation of switches 111B to 113B.

What is claimed is:

1. An object detecting device comprising:
   a pyroelectric sensor generating a sensing current in accordance with changes in the amount of infrared radiation incident on said sensor from an object;
   an I/V converter which converts said sensing current from said pyroelectric sensor into a corresponding voltage;
   a voltage amplifier which amplifies said voltage from the I/V converter into an amplified voltage;
   a detector including a level monitor which compares said amplified voltage with a predetermined detection threshold (TH2) to provide a detection signal when said amplified voltage satisfies a detection criterion with regard to said threshold, said detector responding to said detection signal for issuing a control output which is indicative of the detection of the object and is adapted to actuate an external device;
   wherein
   said voltage amplifier provides a restricted voltage output of low amplitude when receiving a limited source current and provides a rated voltage output of high amplitude when receiving a rated source current greater than said limited source current,
   said detector includes a threshold selector which has said detection threshold (TH2) and a preliminary threshold (TH1) lower than said detection threshold, and which is normally set to provide the preliminary threshold to said level monitor,
   said level monitor compares said restricted voltage output from said voltage amplifier with the preliminary threshold to provide a wake-up signal when the restricted voltage output satisfies a preliminary criteria with regard to said preliminary threshold;

said threshold selector switches said preliminary threshold to said detection threshold in response to said wake-up signal; and said device further includes a mode selector which, in response to the wake-up signal, provides an operation mode for supplying said rated source current from a power source to said voltage amplifier such that said level monitor compares the rated voltage output with said detection threshold for detection of the object, and otherwise provides a standby mode for supplying said limited source current to said voltage amplifier from said power source.

2. The object detecting device as set forth in claim 1, wherein said mode selector keeps said operation mode continuously for a predetermined time frame from the first advent of the detection signal and switches back forcibly to the standby mode thereafter.

3. The object detecting device as set forth in claim 2, wherein said mode selector resets said time frame to start each time said detection signal is followed by another detection signal within said time frame.

4. The object detecting device as set forth in claim 1, wherein said mode selector has a reset input for receiving a reset signal from said external device, said mode selector switching said operation mode forcibly into a rest mode for keeping said limited source current to supply to said voltage amplifier from said power source and at the same time disabling said level monitor upon seeing the first advent of said detection, and keeping said rest mode until receiving said reset signal at said reset input.

5. The object detecting device as set forth in claim 1, wherein said mode selector supplies an initializing current greater than said rated current to said voltage amplifier only for a predetermined initialization time period immediately upon energization of the device.

6. The object detecting device as set forth in claim 5, wherein said mode selector selects a rest mode of supplying said limited source current to said amplifier while disabling said level monitor for a predetermined stabilization time period immediately subsequent to said initialization time period, and switches the reset mode into said standby mode thereafter.

7. The object detecting device as set forth in claim 1, wherein said voltage amplifier is of two-stage amplifier having a front-stage amplifying section and a rear-stage amplifying section, said mode selector supplying said limited source current to said front-stage and rear-stage amplifying sections in said standby mode, and supplying said limited source current to said front-stage amplifying section and supplying said rated source current to said rear-stage amplifying section in said operation mode.

8. The object detecting device as set forth in claim 1, wherein said voltage amplifier provides said rated voltage output which saturates at a level just above said detection threshold.

9. The object detecting device as set forth in claim 1, wherein said mode selector supplies the limited source current to said I/V converter in said standby mode, and supplies the rated source current to said I/V converter in said operation mode.

10. The object detecting device as set forth in claim 1, wherein said threshold selector comprises a first voltage divider composed of a series combination of first resistors to provide said preliminary threshold (TH1) from a reference voltage, and a second voltage divider composed of a series combination of second resistors to provide said detection threshold (TH2) from said reference voltage source, said first resistors having higher resistance than said second resistors.

11. The object detecting device as set forth in claim 10, wherein said first resistor is selected from a non impurity-doped polysilicon resistor, while said second resistor is selected from an impurity-doped polysilicon resistor.

12. The object detecting device as set forth in claim 10, wherein said first resistors is selected from a MOS transistor, while said second resistor is selected from an impurity doped polysilicon resistor.

* * * * *

UNITED STATES PATENT AND TRADEMARK OFFICE
CERTIFICATE OF CORRECTION

PATENT NO. : 6,677,589 B2
DATED : January 13, 2004
INVENTOR(S) : Hironaka et al.

It is certified that error appears in the above-identified patent and that said Letters Patent is hereby corrected as shown below:

Column 4,
Line 52, change "51" to -- 90 --.

Signed and Sealed this

Twentieth Day of July, 2004

JON W. DUDAS
*Acting Director of the United States Patent and Trademark Office*